Patented Mar. 18, 1941

2,235,679

UNITED STATES PATENT OFFICE 2,235,679

PROCESS OF PRODUCING CYCLOPROPANE

Henry B. Hass and George E. Hinds, West Lafayette, Ind., assignors to Purdue Research Foundation, West Lafayette, Ind., a corporation of Indiana No Drawing. Application June 13, 1936, Serial No. 85,048

3 Claims. (Cl. 260—666)

It is the object of our invention to produce cyclopropane rapidly and cheaply from 1,3-dichloropropane (trimethylene chloride) and zinc.

In the co-pending application of two of us (Hass and Hinds), Serial No. 717,429, filed March 26, 1934, a synthesis of cyclopropane from 1,3-dichloropropane and zinc is disclosed. That synthesis is shown by the following summarizing equation:

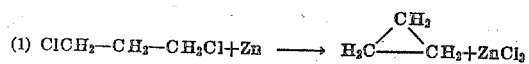

In the Hass and Hinds application, this synthesis of cyclopropane is obtained in the absence of a catalyst but in the presence of certain high-boiling ethers and hydrocarbons, which are compounds containing no hydrogen displaceable by the zinc under the conditions employed in the reaction. While the process there set forth is successful, and can be made to give fairly good yields of cyclopropane, yet the reaction is quite slow, and that slowness is a serious drawback to commercial operation.

We have now found that it is possible by varying the procedure to obtain a number of advantages. Among such advantages are an increased speed of reaction, an increased yield of cyclopropane, a lower temperature of reaction, and the elimination of the necessity of avoiding compounds containing hydrogen replaceable by zinc.

Our procedure is based on a three-fold discovery:

a. We have found that 1-chloro-3-iodopropane and 1,3-di-iodopropane (trimethylene iodide) react with zinc very rapidly, even at temperatures only slightly exceeding room temperature, to give good yields of cyclopropane, and to do so even in the presence of such solvents as alcohol which contain replaceable hydrogen. The summarizing reactions are as follows:

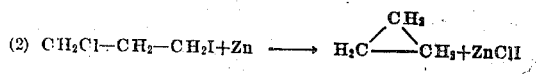
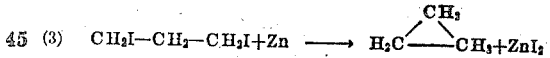

b. We have also found that one or both of the chlorine atoms of 1,3-dichloropropane (trimethylene chloride) may be replaced by iodine by a metathetical reaction with sodium iodide, to yield 1-chloro-3-iodopropane and 1,3-di-iodopropane respectively, as shown by the following reactions:

(4) $CH_2Cl-CH_2-CH_2Cl+NaI \rightarrow$
$CH_2Cl-CH_2-CH_2I+NaCl$ (5) $CH_2Cl-CH_2-CH_2Cl+2NaI \rightarrow$
$CH_2I-CH_2-CH_2I+2NaCl$ Suitable solvents for carrying out this reaction are acetone and ethanol, since sodium iodide is soluble in those solvents, while sodium chloride is practically insoluble in them and so when formed is removed from the reaction by precipitation. The reactions shown by Equations 4 and 5 are in marked contrast to the reaction of most dihaloparaffins with sodium iodide; for such reactions usually proceed in the manner illustrated in the following equation for 1,2-dichloroethane:

(6) $CH_2Cl-CH_2Cl+2NaI \rightarrow C_2H_4+I_2+2NaCl$

It may be that the reactions shown in Equations 4 and 5 are merely summarizing reactions, and we believe that that is the case. We believe that what actually happens is that the sodium iodide ionizes to yield free iodide ions which are present in the solution of sodium iodide in alcohol, and that it is these iodide ions which react with the 1,3-dichloropropane, as shown by the following equations:

(7) $CH_2Cl-CH_2-CH_2Cl+I^- \rightarrow$
$CH_2Cl-CH_2-CH_2I+Cl^-$ (8) $CH_2Cl-CH_2-CH_2Cl+2I^- \rightarrow$
$CH_2I-CH_2-CH_2I+2Cl^-$ The chlorine ions ($Cl^-$) and the free sodium ions ($Na^+$) form sodium chloride, which by reason of its insolubility in the alcohol forms a precipitate and so disappears from the reaction.

The zinc chloroiodide or zinc iodide which is formed by Equation 2 or Equation 3 apparently ionizes very little, if at all, under these conditions, so that it produces at most only slight concentrations of iodide ions.

We have checked these hypotheses by two experiments, in which we added zinc iodide and sodium iodide respectively to a reaction mixture of alcohol, zinc dust, and 1,3-dichloropropane. When the zinc iodide is added, no appreciable acceleration of the reaction was observed. When the sodium iodide was added there was a temporary acceleration of the reaction rate. In the latter case, however, after all the sodium iodide had reacted the reaction rate fell to what it was before the sodium iodide was added. In consequence, in order to accelerate the reaction by the mere addition of sodium iodide it is necessary to employ large quantities of sodium iodide; and that makes the process prohibitively expensive.

c. We have also found, however, that it is possible to regenerate sodium iodide, or the iodide ions therefrom, in the reaction, by the use of a much cheaper reagent; so that such sodium iodide takes on the nature of a catalyst rather than a reactant in the total reaction, and only a small quantity of sodium iodide need be used. This regeneration is obtainable by any reagent which is capable of reacting with zinc iodide to yield a more highly ionized iodide; for such a reagent reacts with the zinc chloroiodide or the zinc iodide of Equations 2 and 3 respectively to reproduce the iodide ions. There are quite a number of reagents which will do this. Two simple ones are sodium carbonate and acetamide.

The reactions of zinc chloroiodide and zinc iodide respectively with sodium carbonate may be represented as follows:

(9) $ZnClI + 2Na^+ + CO_3^{--} \rightarrow ZnCO_3\downarrow + 2Na^+ + I^- + Cl^-$

(10) $ZnI_2 + 2Na^+ + CO_3^{--} \rightarrow ZnCO_3\downarrow + 2Na^+ + 2I^-$

The reactions of acetamide, which involve its use in molten form as the solvent for the main reaction, are as follows:

(11) $ZnClI + X(CH_3-CO-NH_2) \rightarrow Zn^{++}(CH_3-CO-NH_2)_x + I^- + Cl^-$

(12) $ZnI_2 + X(CH_3-CO-NH_2) \rightarrow Zn^{++}(CH_3-CO-NH_2)_x + 2I^-$

We believe that the reaction with acetamide somehow results in a very great increase in the concentration of the iodide ions under these conditions; although we are not certain whether that is due to its forming a complex compound with zinc halides or to the fact that it is an ionizing solvent.

Our three-fold discovery has several results in actual practice:

We may produce cyclopropane by the simple reaction of zinc with either 1-chloro-3-iodopropane or 1,3-di-iodopropane as shown in Equations 2 and 3. This is a new reaction so far as we are aware; for although 1,3-dibromopropane (trimethylene bromide) has been used to react with zinc to yield cyclopropane, and 1,3-dichloropropane (trimethylene chloride) has been so used as set forth in the aforesaid Hass and Hinds co-pending application Serial No. 717,429, the use of 1-chloro-3-iodopropane or 1,3-di-iodopropane (trimethylene iodide) with zinc has not been suggested so far as we know.

The main advantage of our three-fold discovery, however, is in the combination of the three features thereof to obtain a rapid production of cyclopropane from 1,3-dichloropropane, by first converting it into 1-chloro-3-iodopropane and/or 1,3-di-iodopropane by the use of free iodide ions, and then reacting the products so obtained with zinc, while at the same time regenerating in the solution the iodide ions to maintain the reaction rate without requiring sodium iodide in more than catalytic amounts.

An example of this latter process will show the general technique. 300 gm. of acetamide, 0.02 mole of sodium iodide, 0.377 mole of sodium carbonate, and 1.1 moles of zinc dust are placed in a 1-liter three-neck round-bottom flask fitted with a mercury-seal stirrer, a dropping funnel, and a reflux condenser in the respective necks. The reflux condenser is connected at the top to an outlet tube leading to the apparatus for collecting the gas. Any suitable means may be used to remove any ammonia which results from the reaction of traces of moisture with the acetamide. A charge of 0.832 mole of 1,3-dichloropropane is placed in the dropping funnel, and admitted to the body of the flask drop by drop over a period of about five hours while the temperature of the flask is maintained at about 125° C.—desirably within 5° of that temperature. The gaseous product which passes from the top of the reflux condenser and is collected in the collecting apparatus is cyclopropane, which after purification boils between −34.6° and −34.1° C. (uncorrected). The yield is usually of the order of 80% to 85% of the theoretical yield.

Another example of our invention is as follows:

An apparatus is used consisting of a 500 ml. round-bottom 3-neck flask, a condenser, and a motor-driven mechanical stirrer. By means of glass tubing, gases are conducted from the top of the condenser through a trap kept at −20° C. and into a straight tube condenser kept in a bath at about −79° C.

This flask is charged with 120 ml. of 75% aqueous ethanol, 0.1 mole of 1,3-dichloropropane, 0.1 mole of anhydrous sodium carbonate, 0.2 mole of zinc dust, and 1/60 mole of sodium iodide. The flask containing this charge is heated on the steam bath for twelve hours, and about 4.0 g. of crude cyclopropane is usually evolved and collected. This is 95% of theory.

We claim as our invention:

1. The process of producing cyclopropane, which consists in bringing 1,3-dichloropropane and zinc together in the presence of iodide ions.

2. The process of producing cyclopropane, which consists in bringing 1,3-dichloropropane and zinc together in the presence of sodium iodide.

3. The process of producing cyclopropane, which consists in causing a reaction between zinc and 1-chloro-3-iodopropane.

HENRY B. HASS.
GEORGE E. HINDS.